(12) United States Patent
Loh

(10) Patent No.: US 11,232,039 B2
(45) Date of Patent: Jan. 25, 2022

(54) CACHE FOR STORING REGIONS OF DATA

(71) Applicant: Advanced Micro Devices, Inc., Santa Clara, CA (US)

(72) Inventor: Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/214,363

(22) Filed: Dec. 10, 2018

(65) Prior Publication Data
US 2020/0183848 A1    Jun. 11, 2020

(51) Int. Cl.
*G06F 12/0877* (2016.01)

(52) U.S. Cl.
CPC ...... *G06F 12/0877* (2013.01); *G06F 2212/60* (2013.01)

(58) Field of Classification Search
CPC .................. G06F 12/0877; G06F 2212/60
See application file for complete search history.

(56) References Cited

U.S. PATENT DOCUMENTS

| | | | | |
|---|---|---|---|---|
| 5,845,308 A * | 12/1998 | Dockser | ............... | G06F 12/0862 711/3 |
| 7,334,108 B1 * | 2/2008 | Case | .................. | G06F 12/1045 711/209 |
| 2004/0073751 A1 * | 4/2004 | Horrigan | ............. | G06F 12/0804 711/135 |
| 2011/0010504 A1 * | 1/2011 | Wang | .................. | G06F 12/0848 711/129 |
| 2011/0138124 A1 * | 6/2011 | Hill | ..................... | G06F 11/3471 711/122 |
| 2012/0072641 A1 * | 3/2012 | Suzuki | ................ | G06F 12/0246 711/103 |
| 2012/0221774 A1 * | 8/2012 | Atkisson | ............. | G06F 12/0895 711/103 |
| 2014/0143502 A1 | 5/2014 | Loh et al. | | |
| 2015/0242129 A1 * | 8/2015 | Hasan | ................... | G06F 3/0611 711/114 |

(Continued)

OTHER PUBLICATIONS

International Search Report and Written Opinion in International Application No. PCT/US2019/065155, dated Mar. 19, 2020, 12 pages.

(Continued)

*Primary Examiner* — Eric T Oberly
(74) *Attorney, Agent, or Firm* — Kowert Hood Munyon Rankin and Goetzel PC; Rory D. Rankin

(57) ABSTRACT

Systems, apparatuses, and methods for efficiently performing memory accesses in a computing system are disclosed. A computing system includes one or more clients, a communication fabric and a last-level cache implemented with low latency, high bandwidth memory. The cache controller for the last-level cache determines a range of addresses corresponding to a first region of system memory with a copy of data stored in a second region of the last-level cache. The cache controller sends a selected memory access request to system memory when the cache controller determines a request address of the memory access request is not within the range of addresses. The cache controller services the selected memory request by accessing data from the last-level cache when the cache controller determines the request address is within the range of addresses.

20 Claims, 14 Drawing Sheets

(56) References Cited

U.S. PATENT DOCUMENTS

2016/0117254 A1*  4/2016  Susarla .............. G06F 12/0897
                                                        711/119
2017/0212837 A1   7/2017  Breternitz
2017/0212845 A1   7/2017  Conway

OTHER PUBLICATIONS

Sim et al., "A Mostly-Clean DRAM Cache for Effective Hit Speculation and Self-Balancing Dispatch", MICRO-45: Proceedings of the 2012 45th Annual IEEE/ACM International Symposium on Microarchitecture, Dec. 2012, pp. 247-257.

\* cited by examiner

CACHE FOR STORING REGIONS OF DATA

BACKGROUND

Description of the Related Art

As both semiconductor manufacturing processes advance and on-die geometric dimensions reduce, semiconductor chips provide more functionality and performance. However, design issues still arise with modern techniques in processing and integrated circuit design that limit potential benefits. One issue is that interconnect delays continue to increase per unit length in successive generations of two-dimensional planar layout chips. Also, high electrical impedance between individual chips increases latency. In addition, signals that traverse off-chip to another die increase power consumption for these signals due to the increased parasitic capacitance on these longer signal routes.

Another design issue is that most software applications that access a lot of data are typically memory bound in that computation time is generally determined by memory bandwidth. A memory access latency for an off-chip dynamic random access memory (DRAM) is hundreds to over a thousand clock cycles, and an increased number of cores in a processor design have accentuated the memory bandwidth problem. Recently, there has been progress in memory technologies for implementing in-package memory that provides access to a large, low latency, high bandwidth memory before accessing off-package DRAM and main memory.

One example of the memory technology is three-dimensional integrated circuits (3D ICs) used to include two or more layers of active electronic components integrated both vertically and horizontally into a single circuit. The 3D packaging, known as System in Package (SiP) or Chip Stack multi-chip module (MCM), saves space by stacking separate chips in a single package. Components within these layers communicate using on-chip signaling, whether vertically or horizontally. This signaling provides reduced interconnect signal delay over known two-dimensional planar layout circuits.

The manufacturing trends in the above description lead to gigabytes of integrated memory within a single package. In some cases, the computing system uses the additional on-chip storage as a last-level cache before accessing off-chip memory. A reduced miss rate achieved by the additional memory helps hide the latency gap between a processor and its off-chip memory. However, cache access mechanisms for row-based memories are inefficient for this additional integrated memory. Large tag data arrays, such as a few hundred megabytes for a multi-gigabyte cache, are expensive to place on the microprocessor die and provide a high latency for lookups of the large tag arrays. The lookup and data retrieval consume too much time as the tags and data are read out in a sequential manner.

Increasing the size of a data cache line for the additional integrated memory, such as growing from a 64-byte line to a 4-kilobyte (KB) line, reduces both a number of cache lines in the integrated memory and the size of a corresponding tag. However, dirty bits and coherency information are still maintained on a granularity of the original cache line size (64-byte line). Therefore, the on-package DRAM provides a lot of extra data storage, but cache and DRAM access mechanisms are inefficient.

In view of the above, efficient methods and systems for efficiently performing memory accesses in a computing system are desired.

BRIEF DESCRIPTION OF THE DRAWINGS

The advantages of the methods and mechanisms described herein may be better understood by referring to the following description in conjunction with the accompanying drawings, in which.

Figure 1:
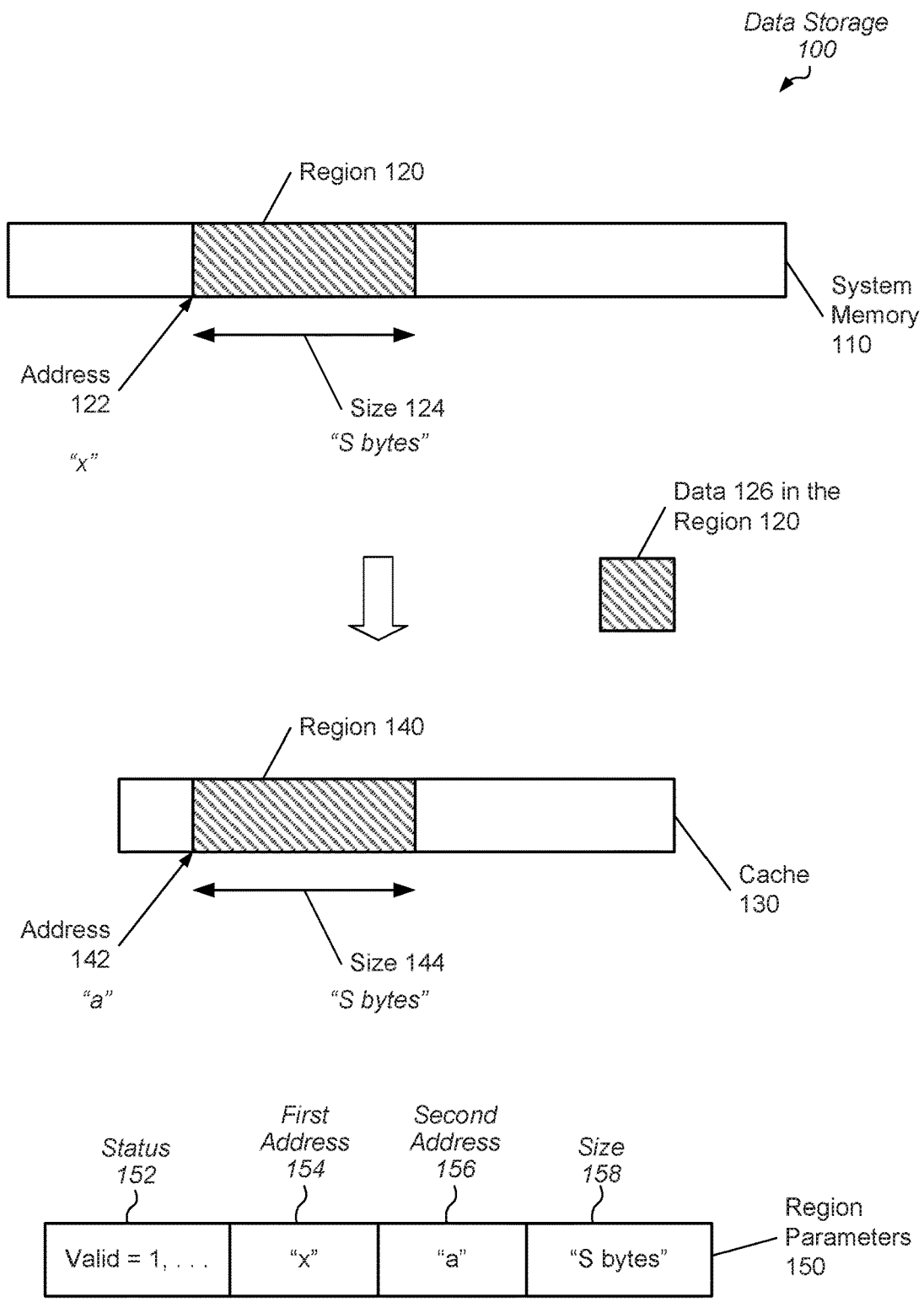
FIG. 1 is a block diagram of one embodiment of data storage.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficiently performing memory accesses in a computing system are disclosed. One or more clients in the computing system process applications. Examples of such clients include a general-purpose central processing unit (CPU), a graphics processing unit (GPU), an accelerated processing unit (APU), an input/output (I/O) device, and so forth. The computing system also includes multiple link interfaces for transferring data between clients. In addition, each of the one or more clients access data from a last-level cache via the communication fabric.

In various embodiments, a cache is implemented with low latency, high bandwidth memory separate from system memory. In some embodiments, the cache is used as a last-level cache in a cache memory subsystem. In other embodiments, the cache is another level within the cache memory subsystem. The system memory includes one of a variety of off-package dynamic random access memory (DRAM) and main memory such as hard disk drives (HDDs) and solid-state disks (SSDs). In some embodiments, the computing system implements the cache with integrated DRAM, such as three-dimensional (3D) DRAM, included in a System-in-Package (SiP) with a processing unit of one of the clients. In other embodiments, the computing system includes one of other memory technologies for implementing the cache such as synchronous RAM (SRAM), embedded DRAM (eDRAM), flash memory such as solid state disks, and one of a variety of non-volatile memories. Examples of the non-volatile memories are phase-change memory, memristors and spin-transfer torque (STT) magnetoresistive random-access memory (MRAM).

A cache controller for the cache includes one or more queues. Each queue stores memory access requests of a respective type. For example, in some designs, a first queue stores memory read requests and a second queue stores memory write requests. Logic within the cache controller selects a queue of the one or more queues and selects a memory access request from the selected queue. The logic determines a range of addresses corresponding to a first region of contiguous data stored in system memory with a copy of the contiguous data stored in a second region of the cache. As used herein, "contiguous data" refers to one or more bits of data located next to one another in data storage. In some embodiments, the size of the contiguous data ranges between a size of a cache line (e.g., 64 bytes) and a size of a page (e.g., 4 kilobytes) in order to provide a size granularity corresponding to a region of predicted upcoming data accesses for a software application being executed. In other embodiments, another size of the contiguous data is used.

At an earlier point in time, when the logic determined a region of predicted upcoming data accesses is defined, the logic stored a copy of the contiguous data from this region, which is the first region in this example, of the system memory into the second region of the cache. The contiguous data in the first region includes data corresponding to the predicted upcoming data accesses. The logic also initialized multiple parameters used to characterize the regions. For example, the logic maintains a first start address pointing to a memory location storing data at the beginning of the system memory. In addition, the logic maintains a second start address pointing to a memory location storing data at the beginning of the second region of the cache. Further, the logic maintains a size of the second region.

In one embodiment, by monitoring received memory access requests and identifying a pattern, the logic predicts a region of the system memory that is going to be accessed with upcoming memory accesses. The logic identifies this region. In response, the logic performs the above steps such as storing a copy of the contiguous data from this region and updating corresponding parameters. In another embodiment, the logic receives one or more hints from software that identifies or is used to identify the region of predicted upcoming data accesses.

When the logic detects a change to the size of the second region, the logic determines a range of addresses beginning at the first start address and ending at an address that is the sum of the first start address and the new size of the second region. In some embodiments, the updates to one or more of the first start address and the size of the second region occurs as data is updated in the second region. The updates to the second region include one or more of adding data, removing data, and overwriting existing data in the second region. When the logic selects a memory access request from one of the multiple queues, the logic of the cache controller compares a request address of the selected memory access request to the range of addresses. The logic determines whether the request address is within this range. Therefore, to determine whether there is a cache hit or a cache miss within the last-level cache, the logic compares the request address to this maintained range of addresses, rather than performs a set-associative lookup or a fully-associative lookup of the tag arrays in the cache. The comparison is a faster operation than the lookup operations of indexes and tags of the cache.

When the logic determines that the request address of the selected memory access request is not within the range of addresses, the logic sends the selected memory access request to system memory for servicing. However, when the logic determines that the request address is within the range of addresses, the logic services the memory access request by accessing data from the cache. In order to do so, the logic determines an offset based on a difference between the request address and the first start address. Afterward, the logic determines a translated address based on the offset and the second start address. Following, the logic services the memory access request by accessing data from the cache beginning at the translated address.

Referring to FIG. 1, a generalized block diagram of one embodiment of data storage 100 is shown. As shown, each of system memory 110 and a last-level cache 130 store data. Although the description describes the cache 130 as a last-level cache, in other embodiments, the cache 130 is another level within the cache memory subsystem. Processing units, communication interfaces and so forth are not shown for ease of illustration. Data 126 is contiguous data stored in the region 120 of the system memory 110. The last-level cache 130 stores in the region 140 a copy of the contiguous data 126 of the region 120. The region parameters 150 characterize the regions 120 and 140.

In various designs, the system memory 110 includes one or more of off-package DRAM, hard disk drives (HDDs) and solid-state disks (SSDs). In some designs, the last-level cache 130 includes on-package, low latency, high bandwidth memory separate from the system memory 110. In some designs, the last-level cache 130 includes 3D DRAM. In other designs, the last-level cache 130 includes synchronous RAM (SRAM), embedded DRAM (eDRAM), flash memory such as solid state disks, and one of a variety of non-volatile memories. Examples of the non-volatile memories are phase-change memory, memristors and spin-transfer torque (STT) magnetoresistive random-access memory (MRAM).

In the illustrated embodiment, the address 122, which is also referred to as "x", points to a memory location storing data at the beginning of the region 120. Here, the generic value "x" is any value represented in any manner such as integer, hexadecimal, and so forth. The region 120 has a size 124, which is also referred to as "S bytes." In a similar manner, the address 142, which is also referred to as "a", points to a memory location storing data at the beginning of the region 140. The region 140 has a size 144, which is also referred to as "S bytes," and it is equal to the size 124 of region 120. The values "x", "S" and "a" are positive integers.

In some embodiments, sequential elements in a cache controller for the last-level cache 130 store the region parameters 150. Examples of the sequential elements are registers, flip-flop circuits, and latches. In an embodiment, the region parameters 150 include status information 152 such as a valid bit and metadata. Examples of the metadata are identifiers of the producer of the data 126, identifiers of the consumer of the data 126, cache coherency information for the data 126, clean/dirty information for the data 126, and so on. The identifiers for the producer and the consumer include one or more of a processing unit identifier, a process identifier, a thread identifier. In other embodiments, the region parameters 150 do not include the status information 152, since this information is stored in other queues and sequential elements in the cache controller.

In an embodiment, the region parameters 150 include two addresses. The first address 154 is a copy of the address 122, which points to a memory location storing data at the beginning of the region 120. The second address 156 is a copy of the address 142, which points to a memory location storing data at the beginning of the region 140. Therefore, the region parameters 150 include a memory mapping between the beginning of the region 120 and the beginning of the region 140. For example, the region parameters 150 currently stores a memory mapping between the address 122 ("x") and the address 142 ("a"). In some embodiments, the region parameters 150 also includes the size 158 of the region 140. In an embodiment, logic in the cache controller uses a size value of zero bytes in the size field 158 to indicate no valid region is stored in the last-level cache, rather than a valid bit in the status field 152.

Using the region parameters 150, the logic in the cache controller determines a cache hit or a cache miss for the last-level cache 130 with a comparison operation that is faster than a lookup operation in a large tag array. In one example, the logic determines whether a valid region is stored in the last-level cache 130. If a status field 152 is used and a valid bit is negated, then there is no valid region stored in the last-level cache 130. If a status field 152 is not used and the size field 158 stores a value of zero bytes, then there is no valid region stored in the last-level cache 130. In such cases, the logic in the cache controller determines that there is a cache miss, and sends the memory access request with the request address to the system memory 110 for servicing. Therefore, the logic skips performing set-associative lookup operations into a set of the large tag array selected by an index of the request address, which reduces the latency of handling the memory access request.

If a status field 152 is used and a valid bit is asserted, or if a status field 152 is not used, but the size field 158 stores a positive, non-zero integer, then the logic of the cache controller determines that there is a valid region stored in the last-level cache 130. In such a case, the logic in the cache controller determines a range of addresses when the logic determines a change in one or more of the address 122 ("x") and the size 158 ("S") of the region 140. The logic determines the range of addresses as beginning at the address 122 ("x") and ending at an address that is the sum of the address 122 and the size 158 ("S") of the region 140. Using the notation in the illustrated embodiment, the range of addresses is "x+S". The logic determines whether the request address is within this range. For example, if the request address is denoted as "y," then the logic determines whether the expression, $x \leq y < (x+S)$, is true. Therefore, to determine whether there is a cache hit or a cache miss within the last-level cache 130, the logic compares the request address to this range of addresses. The comparison operation is a faster operation than the lookup operations of indexes and tags of the last-level cache 130.

If the logic determines the access of the last-level cache 130 is a cache miss, then the cache controller sends the memory access request with the request address to the system memory 110 for servicing. However, if the logic determines the access of the last-level cache 130 is a cache hit, then the logic services the memory access request by retrieving data from the last-level cache 130. In order to do so, the logic determines an offset based on a difference between the request address ("y") and the address 122 ("x"), which is expressed as (y−x). The logic determines a translated address based on the offset (y−x) and the address 142 ("a"), which is the sum of the two values and is expressed as (a+(y−x)). The logic services the memory access request by accessing data from the last-level cache 130 beginning at the translated address, or at the address represented by (a+(y−x)). The logic skips performing set-associative lookup operations into a set of the large tag array selected by an index of the request address. Rather, after the comparison operation used to determine the cache hit, simple arithmetic operations are used to identify the location storing the requested data in the last-level cache 130.

Figure 2:
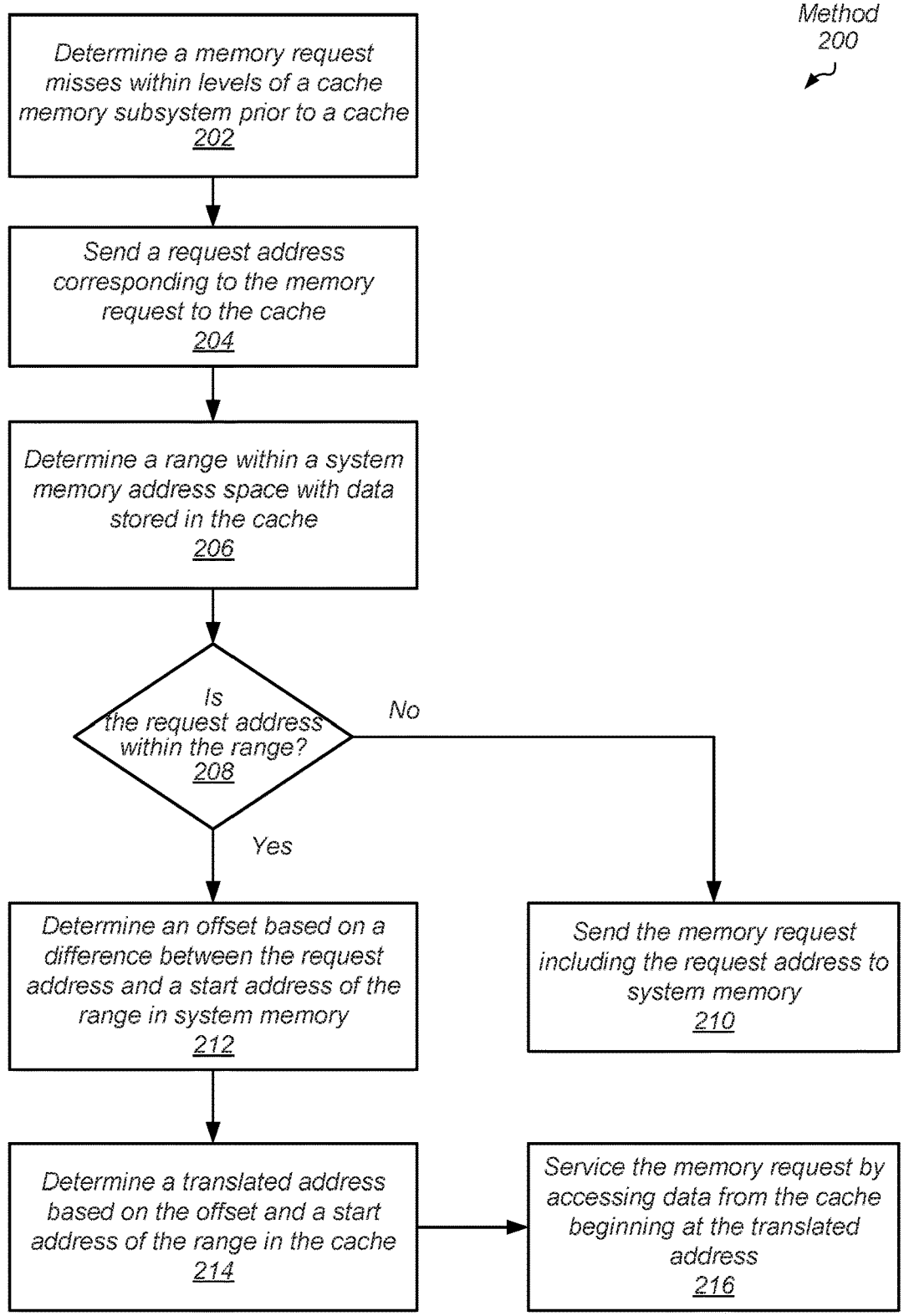
FIG. 2 is a flow diagram of one embodiment of a method for performing efficient memory accesses in a computing system.

Referring now to FIG. 2, one embodiment of a method 200 for efficiently performing memory accesses in a computing system is shown. For purposes of discussion, the steps in this embodiment (as well as in FIGS. 10 and 14) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 200, 1000 and 1400.

One or more processing units execute one or more computer programs, or software applications. Examples of a processing unit are a processor core within a general-purpose central processing unit (CPU), a graphics processing unit (GPU), or other. In some embodiments, a System-in-Package (SiP) includes the processing unit and an on-package, low latency, high bandwidth memory. One example of such a memory is a 3D integrated memory, such as a 3D DRAM. In an embodiment, the processing unit utilizes at least a portion of the 3D DRAM as a cache. In one embodiment, the cache is a last-level cache. Although the following description describes the low latency, high bandwidth memory as being used as a last-level cache, in other embodiments, the high bandwidth memory is used as a first-level (L1), a second-level (L2), or other level in the cache memory hierarchy other than the last-level. The processing unit determines a memory request misses within the cache memory subsystem in levels lower than the last-level cache (block 202).

The processing unit sends a request address corresponding to the memory request to the last-level cache (block 204). In an embodiment, the logic in the cache controller for the last-level cache maintains an identification of a first region of contiguous data in the system memory that has a copy of the contiguous data stored in a second region of the last-level cache. In some embodiments, the identification includes a first start address that identifies the beginning of the first region. Additionally, the identification includes a size of the second region. Logic in the cache controller for the last-level cache determines a range of addresses for this first region, which is a range of addresses within the system memory address space pointing to the memory locations storing the contiguous data stored in the system memory (block 206). This contiguous data has a copy stored in the last-level cache. In some designs, the logic uses the expressions described earlier in the description of the data storage 100 (of FIG. 1).

If the request address is not within the range ("no" branch of the conditional block 208), then logic sends the memory request including the request address to system memory (block 210). The access of the last-level cache for the memory request is considered to be a cache miss, and accordingly, the memory request is sent to a lower level of the memory subsystem such as the system memory. If the request address is within the selected range ("yes" branch of the conditional block 208), then logic determines an offset based on a difference between the request address and a start address of the range in system memory (block 212). Logic determines a translated address based on the offset and a start address of the range in the last-level cache (block 214). For example, the translated address is a sum of the offset and a start address of the range in the last-level cache. Logic services the memory request by accessing data from the last-level cache beginning at the translated address (block 216).

Figure 3:
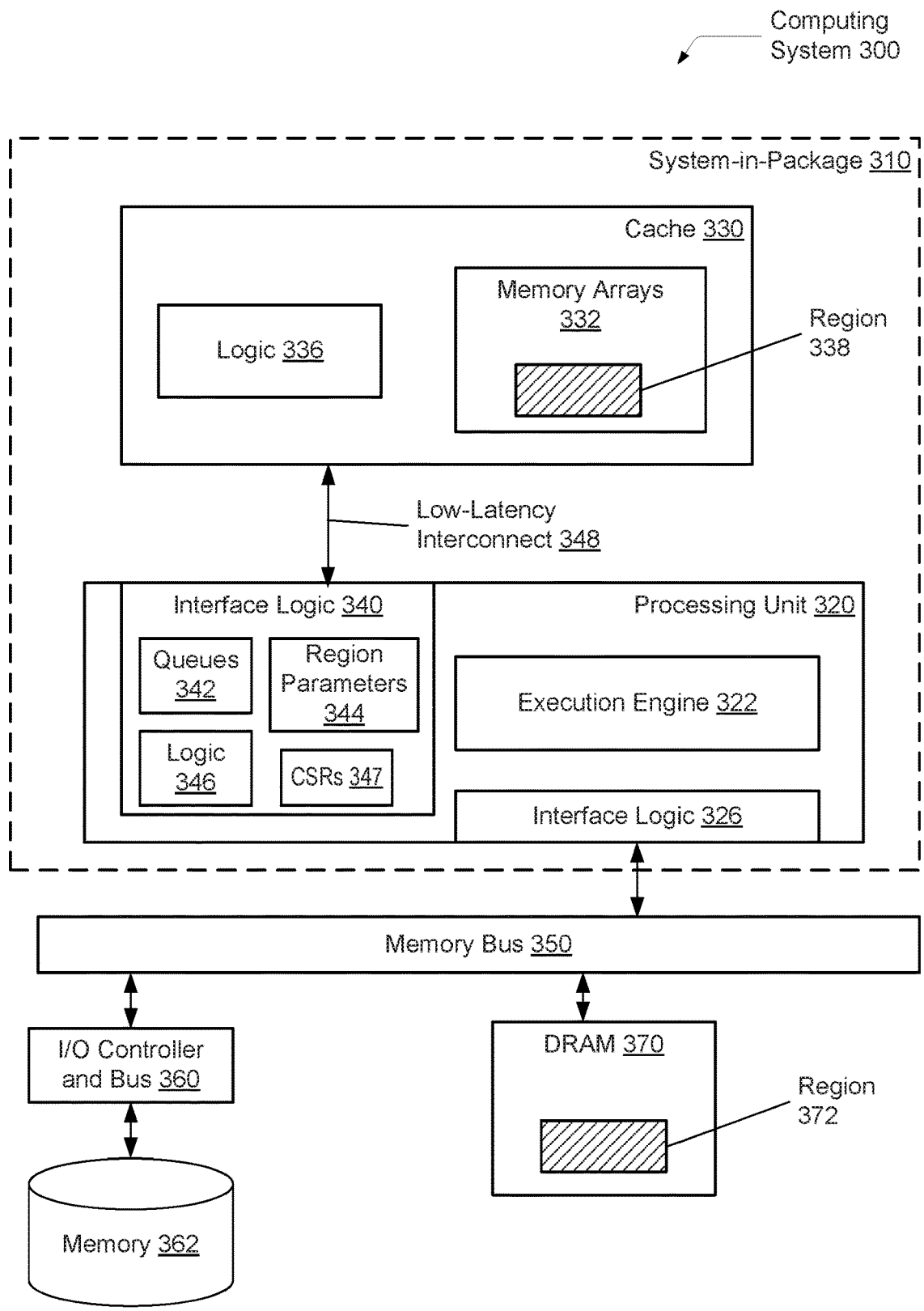
FIG. 3 is a block diagram of one embodiment of a computing system.

Turning now to FIG. 3, a generalized block diagram of one embodiment of a computing system 300 utilizing a low-latency, high-bandwidth cache is shown. In various embodiments, the computing system 300 utilizes three-dimensional (3D) packaging such as the System in Package (SiP) 310. The SiP 310 is connected to a memory 362 and off-package DRAM 370 via a memory bus 350. In one embodiment, the computing system 300 is a stand-alone system within a mobile computer, a smart phone, or a tablet; a desktop; a server; or other. The SiP 310 uses the processing unit 320 and a low-latency, high-bandwidth cache 330. The processing unit 310 and the cache 330 communicate through low-latency interconnect 348. The in-package low-latency interconnect 348 uses one or more of horizontal and/or vertical routes with shorter lengths than long off-chip interconnects when a SiP is not used.

Although, in some embodiments, the SiP 310 utilizes DRAM memory technology, such as 3D DRAM, other memory technologies that use a low latency, high bandwidth and row-based access scheme including one or more row buffers or other equivalent structures are possible and contemplated. Examples of other memory technologies are phase-change memories, spin-torque-transfer resistive memories, memristors, embedded DRAM (eDRAM), and so forth. In some designs, the processing unit 320 is a general-purpose microprocessor, whereas, in other designs, the processing unit 320 is another type of processing unit. Other types of processing units include a graphics processing unit (GPU), a field programmable gate array (FPGA), an accelerated processing unit (APU), which is a chip that includes additional processing capability. This additional processing capability accelerates one or more types of computations outside of a general-purpose CPU. In one embodiment, an APU includes a general-purpose CPU integrated on a same die with a GPU, a FPGA, or other processing unit, thus improving data transfer rates between these units while reducing power consumption. In other embodiments, an APU includes video processing and other application-specific accelerators.

The execution engine 322 uses one or more processor cores based on the type of the processing unit 320. Additionally, in some designs, the execution engine 322 uses a communication fabric (or "fabric") for transferring communication messages. Examples of communication messages are coherency probes, interrupts, and read and write access commands and corresponding data. Examples of interconnections in the fabric are bus architectures, crossbar-based architectures, network-on-chip (NoC) communication subsystems, communication channels between dies, silicon interposers, and through silicon vias (TSVs). In many designs, the processing unit 320 incorporates a system bus controller in the interface logic 326 that utilizes one of various protocols to connect the processor cores of the execution engine 322 to memory 362, DRAM 370, peripheral input/output (I/O) devices and other processing units.

The computing system 300 uses the off-package memory 362 as main memory, or system memory. The memory 362 is one of hard disk drives (HDDs) and solid-state disks (SSDs). The off-package DRAM 370 is one of a variety of types of DRAM. The computing system 300 fills the off-chip DRAM 370 with data from the off-chip memory 362 through the I/O controller and bus 360 and the memory bus 350. The interface logic 360 supports communication protocols, address formats and packet formats for each of the off-package memory 362 and the off-package DRAM 370.

Each of the processor cores within the execution engine 322 uses one or more levels of a cache memory subsystem for reducing memory latencies for the processor cores. In some designs, the processor cores additionally access a shared cache within the execution engine 322. When the cache memory subsystem within the execution engine 322 does not include data requested by a processor core, the execution engine 322 sends the memory access request to the in-package cache 330. The interface logic 340 supports communication protocols, address formats and packet formats for transferring information between the in-package cache 330 and the processing unit 320.

Similar to other DRAM topologies, in some designs, the in-package cache 330 uses multiple memory arrays 332 that are segmented into multiple banks. In such cases, each one of the banks includes a respective row buffer. Each one of the row buffers stores data in an accessed row of the multiple rows within the corresponding memory array bank. In some embodiments, the functionality of the queues 342, the region parameters 344, and the portion of the logic 346 that uses the region parameters 344, are located in the logic 336. For example, this functionality is included in a cache controller for the in-package cache 330. In other embodiments, this functionality is located in the interface logic 340 as shown. Each of the logic 336 and the logic 346 is implemented by software, hardware such as circuitry used for combinatorial logic and sequential elements, or a combination of software and hardware.

When the interface logic 340 receives a memory access request from the execution engine 322, the logic 346 stores received memory access requests in one of the multiple queues 342 based on access type. For example, a first queue of the queues 342 stores memory read requests and a second queue of the queues 342 stores memory write requests. Arbitration logic within the logic 346 selects a queue of the multiple queues 342 and selects a memory access request from the selected queue. For the selected memory access request, the logic 346 determines a range of addresses corresponding to a first region of system memory, such as region 372, with a copy of data stored in a second region of the in-package cache 330, such as region 338. The system memory is implemented by the combination of the off-package memory 362 and the off-package DRAM 370.

The logic 346 sends a selected memory access request to system memory when the logic 346 determines a request address of the memory access request is not within the range of addresses for the region 372. The cache controller services the selected memory request by accessing data from the memory arrays 332 within the in-package cache 330 when the logic 346 determines the request address is within the range of addresses for the region 372. The logic 346 uses the region parameters 344 for the above determinations. In various embodiments, the region parameters 344 are equivalent to the region parameters 150 (of FIG. 1).

The logic 346 uses one of a variety of techniques for determining when to store a copy of the region 372 in the off-package system memory as region 338 in the in-package cache 330. In some embodiments, the logic 346 monitors memory accesses from the execution engine 322 to detect a streaming or sequential memory access pattern. The logic 346 uses one of a variety of techniques to detect streaming access patterns such as at least the techniques used by hardware prefetchers. When the logic 346 detects a streaming pattern, the logic 346 defines a new region. In some embodiments, when a memory request accesses an address that is within L bytes of the end of the region 338, one of the logic 336 and logic 346 extends the size of the region 338 by P bytes where L and P are positive, non-zero integers. In an embodiment, the values of L and P are stored in programmable registers in the control and status registers (CSRs) 347. In some embodiments, an initial region size is also stored in a programmable register in CSRs 347.

In other embodiments, the logic 346 uses software hints for determining when to define and create the region 338 in the in-package cache 330. Software uses particular instructions to update certain registers accessed by the application or the operating system. In addition, the software is capable of updating one or more control and status registers (CSRs) 347 in the interface logic 340. When processing a deep neural network, the software application is aware of when it finishes processing one layer of a multi-layer neural network and when it moves on to the next layer of the multi-layer network. As each layer of the multi-layer network is traversed (whether forward or backward), the software application utilizes software hints to inform one or more of the logic 346 and the CSRs 347 of the current region in the system memory that is being processed. In some embodiments, the software application provides hints to indicate when to increase or decrease the sizes of the regions 372 and 338. The hints also indicate to change the sizes from the left direction or the right direction of the regions 372 and 338.

Additionally, the software hints indicate when to change the entire content of the regions 372 and 338 by moving to another region in the system memory. Limits stored in the CSRs 347 prevent the region 338 from exceeding the size of the in-package cache 330. In some embodiments, if the logic 346 already defines a region, the logic 346 selects between supporting the existing region and a new region based on criteria. Examples of the criteria are a size of the region, a priority level of an application accessing the data of the regions, an age of the existing region, and so forth.

During the execution of one or more software applications, the applications modify the contents of the region 338. If the logic 346 adjusts the size or the portion of the region 338 such that a modified portion of the region 338 is no longer valid, then one of the logic 336 and the logic 346 sends the modified data to the off-package DRAM 370. In some designs, one of the logic 336 and the logic 346 controls the in-package cache 330 with a write-through cache policy or a write-back cache policy. The write-through cache policy spreads out the write operations to the off-package DRAM 370 over time. In contrast, the write-back cache policy delays the write operations until the size of the region 338 reduces. At such a time, the logic 336 or the logic 346 sends the write operations for the modified data to the off-package DRAM 370 in a burst of write traffic. In other designs, one of the logic 336 and the logic 346 controls the in-package cache 330 with a combination of a write-through cache policy and a write-back cache policy to trade off the benefits and the costs of the two policies.

Figure 4:
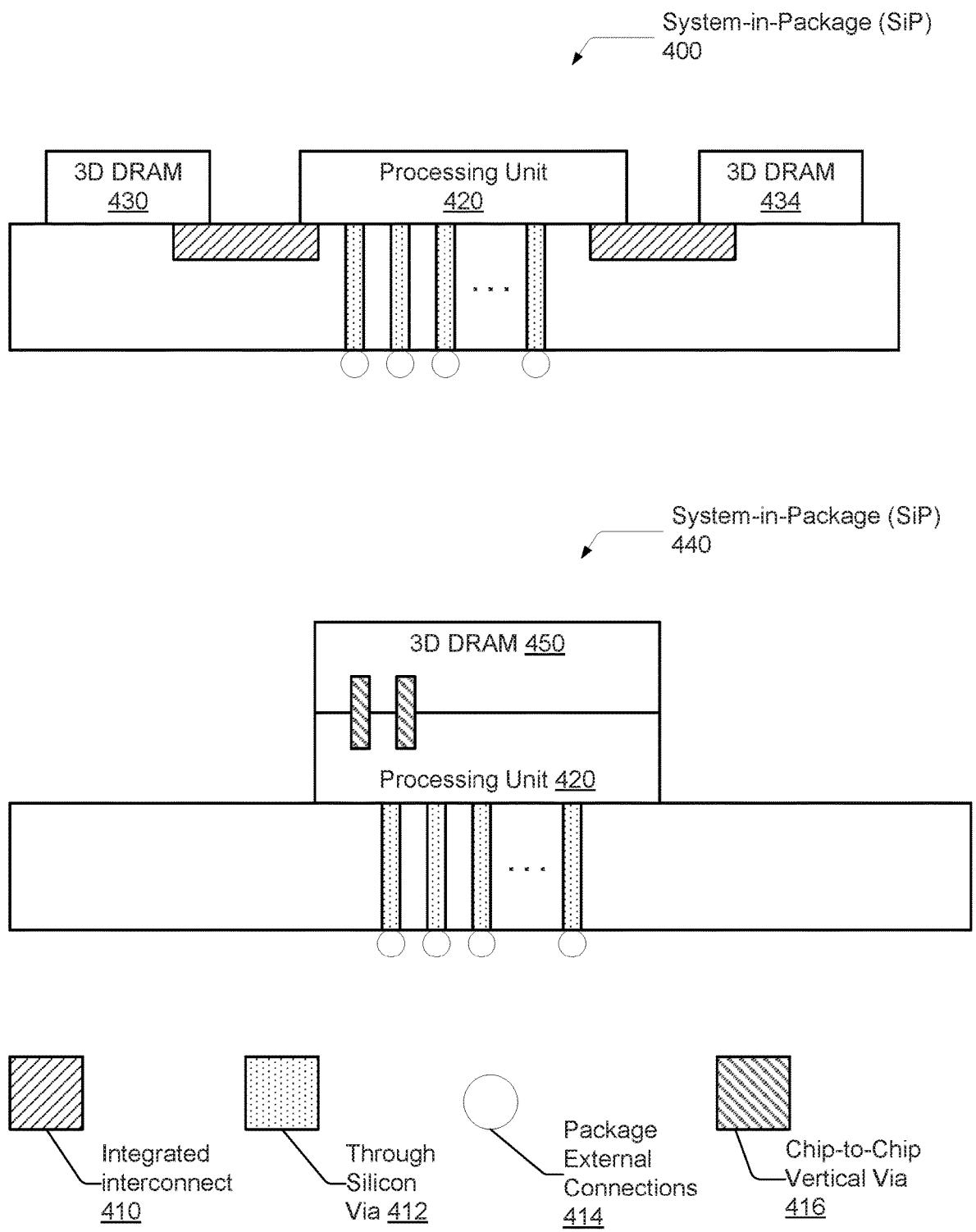
FIG. 4 is a block diagram of one embodiment of a system-in-package (SiP).

As described earlier, in some designs, the in-package cache 330 uses low latency, high bandwidth memory technologies such as SRAM, phase-change memories, spin-torque-transfer resistive memories, memristors, embedded DRAM (eDRAM), and so forth. In other designs, the in-package cache 330 uses low latency, high bandwidth 3D DRAM. Turning now to FIG. 4, a generalized block diagram of embodiments of systems-in-package (SiP) 400 and 440 are shown. The illustrated SiP includes one or more three-dimensional integrated circuits (3D ICs). A 3D IC includes two or more layers of active electronic components integrated both vertically and/or horizontally into a single circuit. In some designs, fabrication techniques use interposer-based integration whereby the fabrication technique places the 3D IC next to the processing unit 420.

Alternatively, fabrication technique stacks a 3D IC directly on top of another IC.

Die-stacking technology is a fabrication process that enables the physical stacking of multiple separate pieces of silicon (integrated chips) together in a same package with high-bandwidth and low-latency interconnects. The dies are stacked side by side on a silicon interposer, or vertically directly on top of each other. One configuration for the SiP is to stack one or more DRAM chips next to and/or on top of a processing unit. The stacked DRAM chips provide a very large cache for the processing unit. In some designs, this large cache has a size on the order of several hundred MB (or more).

As shown, in one embodiment, the SiP 400 includes a processing unit 420 and one or more three-dimensional (3D) DRAM 430 and 432 that communicate with the processing unit 420 through horizontal low-latency interconnect 410. Again, the processing unit 420 is one of a general-purpose CPU, a graphics processing unit (GPU), an accelerated processing unit (APU), a field programmable gate array (FPGA), or other data processing device that makes use of a row-based memory, such as a cache.

The in-package horizontal low-latency interconnect 410 provides reduced lengths of interconnect signals versus long off-chip interconnects when a SiP is not used. The in-package horizontal low-latency interconnect 410 use particular signals and protocols as if the chips, such as the processing unit 420 and the 3D DRAMs 430 and 432, were mounted in separate packages on a circuit board. The SiP 400 additionally includes backside vias or through-bulk silicon vias 412 that reach to package external connections 414. The package external connections 414 are used for input/output (I/O) signals and power signals.

In another embodiment, the SiP 440 includes a 3D DRAM 450 stacked directly on top of the processing unit 420. Although not shown, for each of the SiP 400 and the SiP 440, multiple chips, or device layers, are stacked on top of one another with direct vertical interconnects 416 tunneling through them. The size and density of the vertical interconnects 416 that can tunnel between the different device layers varies based on the underlying technology used to fabricate the 3D ICs.

Figure 5:
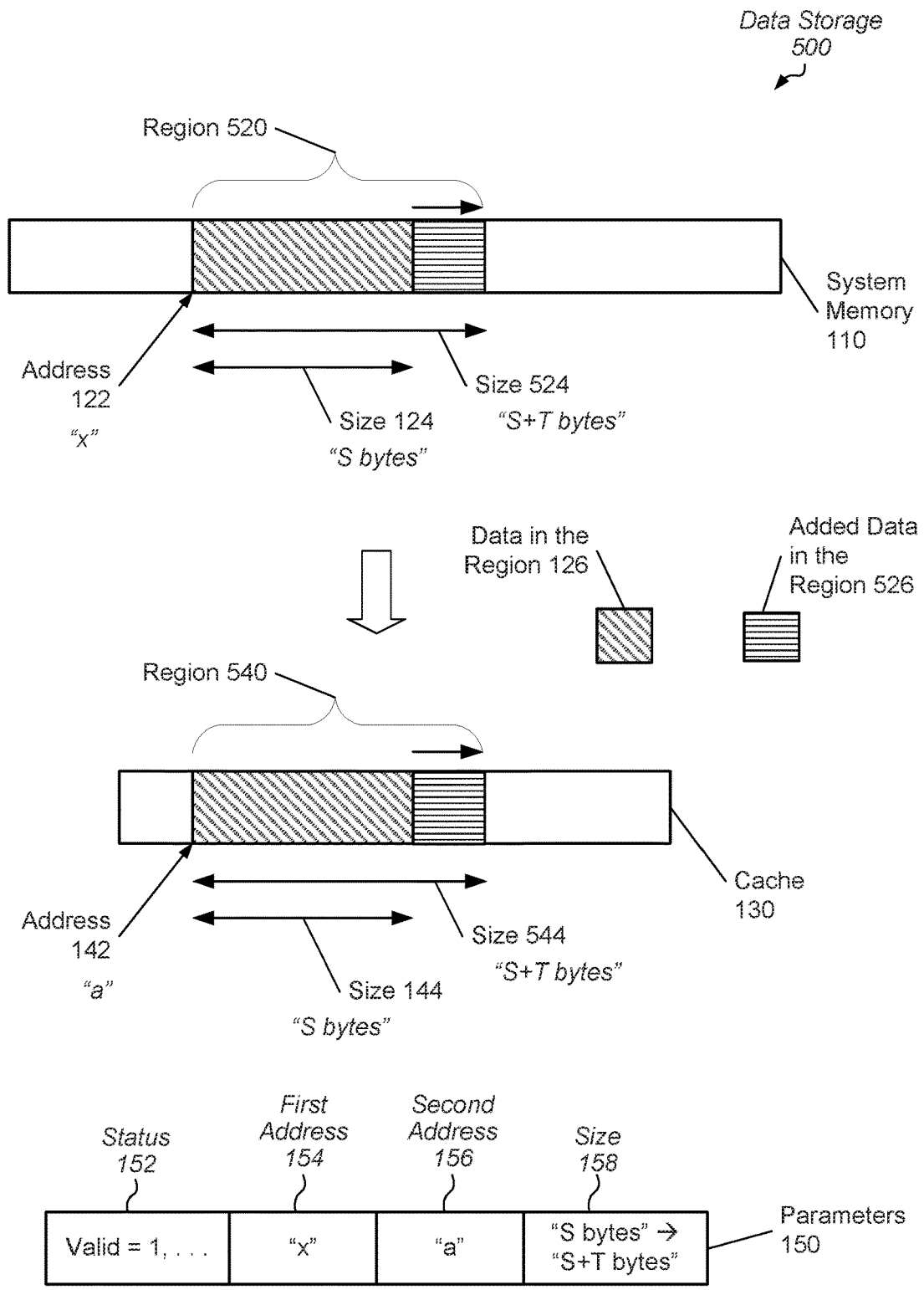
FIG. 5 is a block diagram of one embodiment of data storage.

Referring to FIG. 5, a generalized block diagram of one embodiment of data storage 500 is shown. Circuitry and logic previously described are numbered identically. As shown, each of system memory 110 and a last-level cache 130 store data. Again, although the description describes the cache 330 as a last-level cache, in other embodiments, the cache 330 is another level within the cache memory subsystem. Data 126 is contiguous data stored in the system memory 110. Data 526 is contiguous data added to the region in the system memory 110 to create the region 520. The size of contiguous data in the system memory 110 copied as a region grew from the size 124 to the size 524.

The last-level cache 130 stores in the region 540 a copy of the contiguous data 126 and data 526 of the region 520. Accordingly, the size of contiguous data in the last-level cache 130 maintained as a region grew from the size 144 to the size 544. The region parameters 150 characterize the regions 520 and 540. The start addresses 122 and 142 remain the same. Therefore, the fields 154 and 156 remain unchanged in the region parameters 150. However, logic updates the size field 158 to an increased amount. In the example, the logic updates the size field 158 from S bytes to S+T bytes where S and T are positive, non-zero integers.

Figure 6:
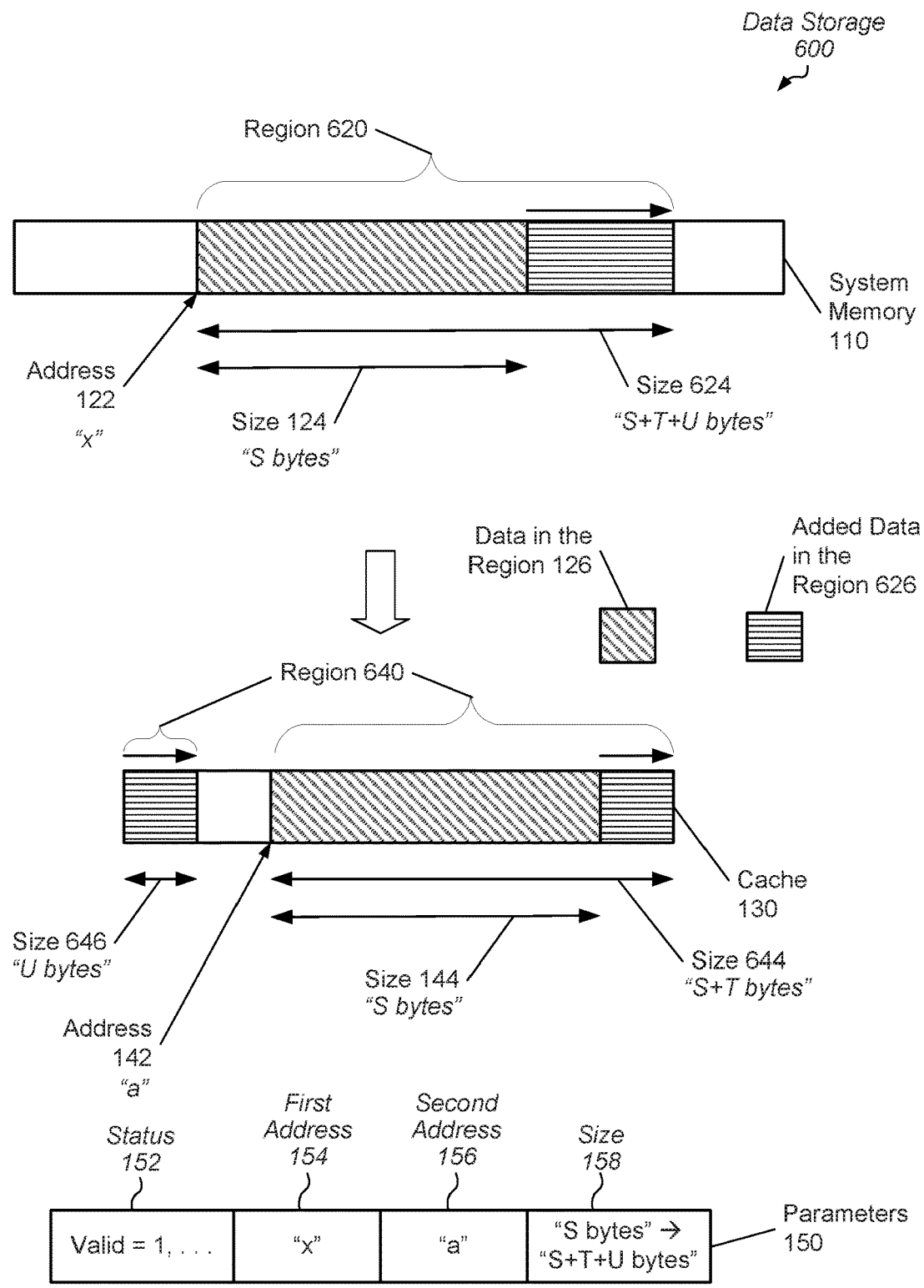
FIG. 6 is a block diagram of one embodiment of data storage.

Turning now to FIG. 6, a generalized block diagram of one embodiment of data storage 600 is shown. Circuitry and logic previously described are numbered identically. Data 126 is contiguous data stored in the system memory 110. Data 626 is contiguous data added to the region in the system memory 110 to create the region 620. The size of contiguous data in the system memory 110 copied as a region grew from the size 124 to the size 624.

The last-level cache 130 stores in the region 640 a copy of the contiguous data 126 and data 626 of the region 620. Accordingly, the size of contiguous data in the last-level cache 130 maintained as a region grew from the size 144 to the sum of the size 644 and the size 646. The contiguous data wrapped around the last-level cache 130. The region parameters 150 characterize the regions 620 and 640. The start addresses 122 and 142 remain the same. Therefore, the fields 154 and 156 remain unchanged in the region parameters 150. However, logic updates the size field 158 to an increased amount. In the example, the logic updates the size field 158 from S bytes to S+T+U bytes where S, T and U are positive, non-zero integers.

The access of a wrap around region alters the calculation of the translated address for the last-level cache 130. In one example, the region 620 uses the address space 2,000 to 2,700 where the addresses are expressed as digits. The entire last-level cache 130 uses the address space 5,000 to 6,000 where the addresses are also expressed as digits. The region 640 uses the address space 5,800 wrapped around to 5,500. When a received memory request uses the request address 2,400, logic determines that the offset is (2,400−2,000), or 400. The logic adds the offset to the region start address of 5,800 to obtain (5,800+400), or 6,200. This value exceeds the limit of the region 640. In response, the logic determines the difference, which is (6,200−6,000), or 200. The logic adds the difference to the start address to obtain (5,000+200), or 5,200. The translated address is 5,200, and the logic uses the translated address 5,200 to access data from the last-level cache 130 in order to service the memory request.

Figure 7:
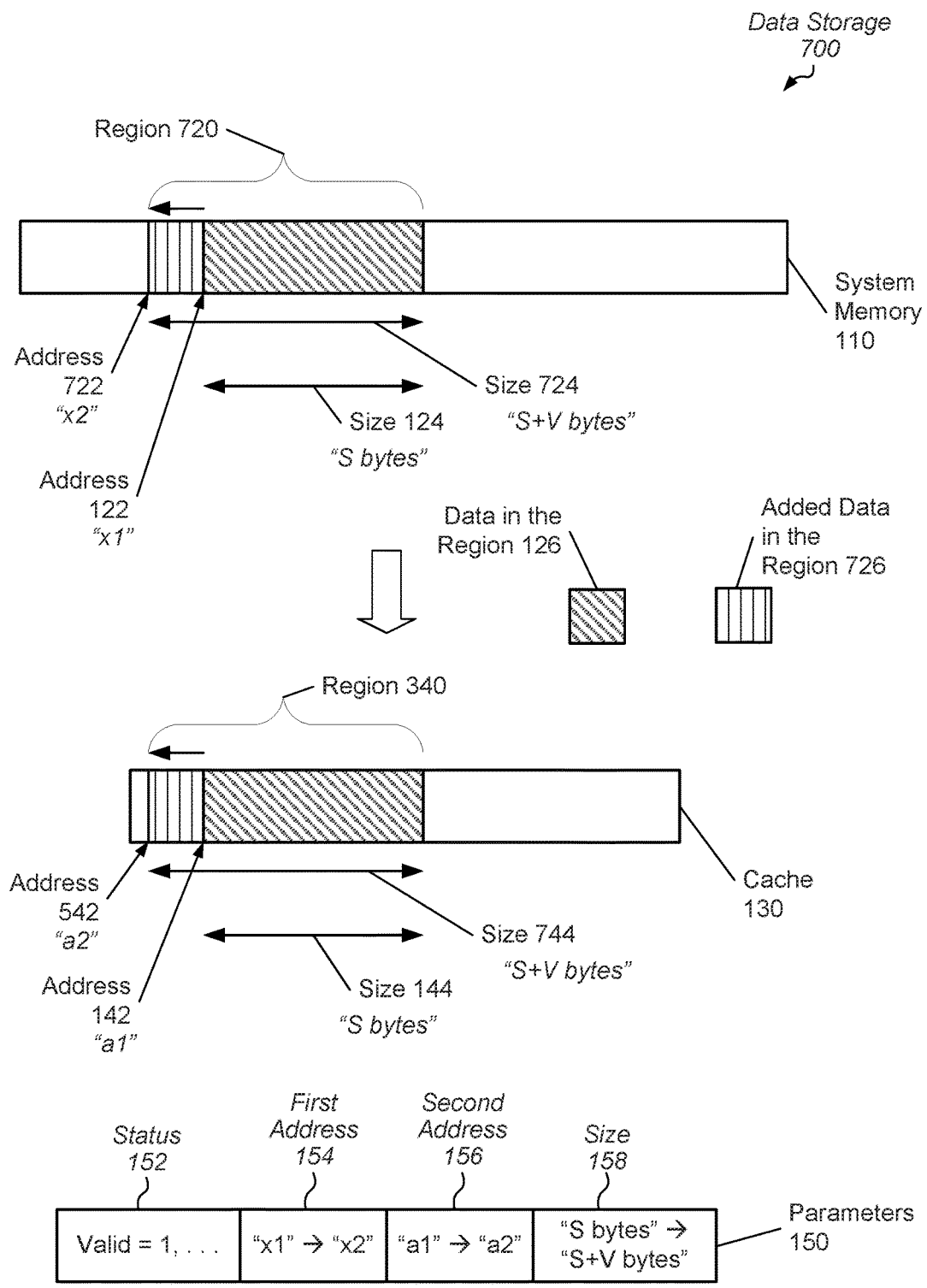
FIG. 7 is a block diagram of one embodiment of data storage.

Referring to FIG. 7, a generalized block diagram of one embodiment of data storage 700 is shown. Similar to data storage 500 and 600 and upcoming data storage 800-900 and 1300, circuitry and logic previously described are numbered identically. As shown, each of system memory 110 and a last-level cache 130 store data. Although the description describes the cache 330 as a last-level cache, in other embodiments, the cache 330 is another level within the cache memory subsystem. Data 126 is contiguous data stored in the system memory 110. Data 726 is contiguous data added to the region in the system memory 110 to create the region 720. The size of contiguous data in the system memory 110 copied as a region grew from the size 124 to the size 724. The increase is in the left direction, rather than the right direction. Accordingly, the address pointing to the memory location storing data at the beginning of the region 720 is address 722 ("x2"), rather than the address 122 ("x1").

The last-level cache 130 stores in the region 740 a copy of the contiguous data 126 and data 726 of the region 720. Accordingly, the size of contiguous data in the last-level cache 130 maintained as a region grew from the size 144 to the size 744. The increase is in the left direction, rather than the right direction. Accordingly, the address pointing to the memory location storing data at the beginning of the region 740 is address 742 ("a2"), rather than the address 142 ("a1"). The region parameters 170 characterize the regions 720 and 740. The start addresses 122 and 142 change, and the fields 154 and 156 indicate the changes in the region parameters 150. Logic also updates the size field 158 to an increased amount. In the example, the logic updates the size field 158 from S bytes to S+V bytes where S and V are positive, non-zero integers.

Figure 8:
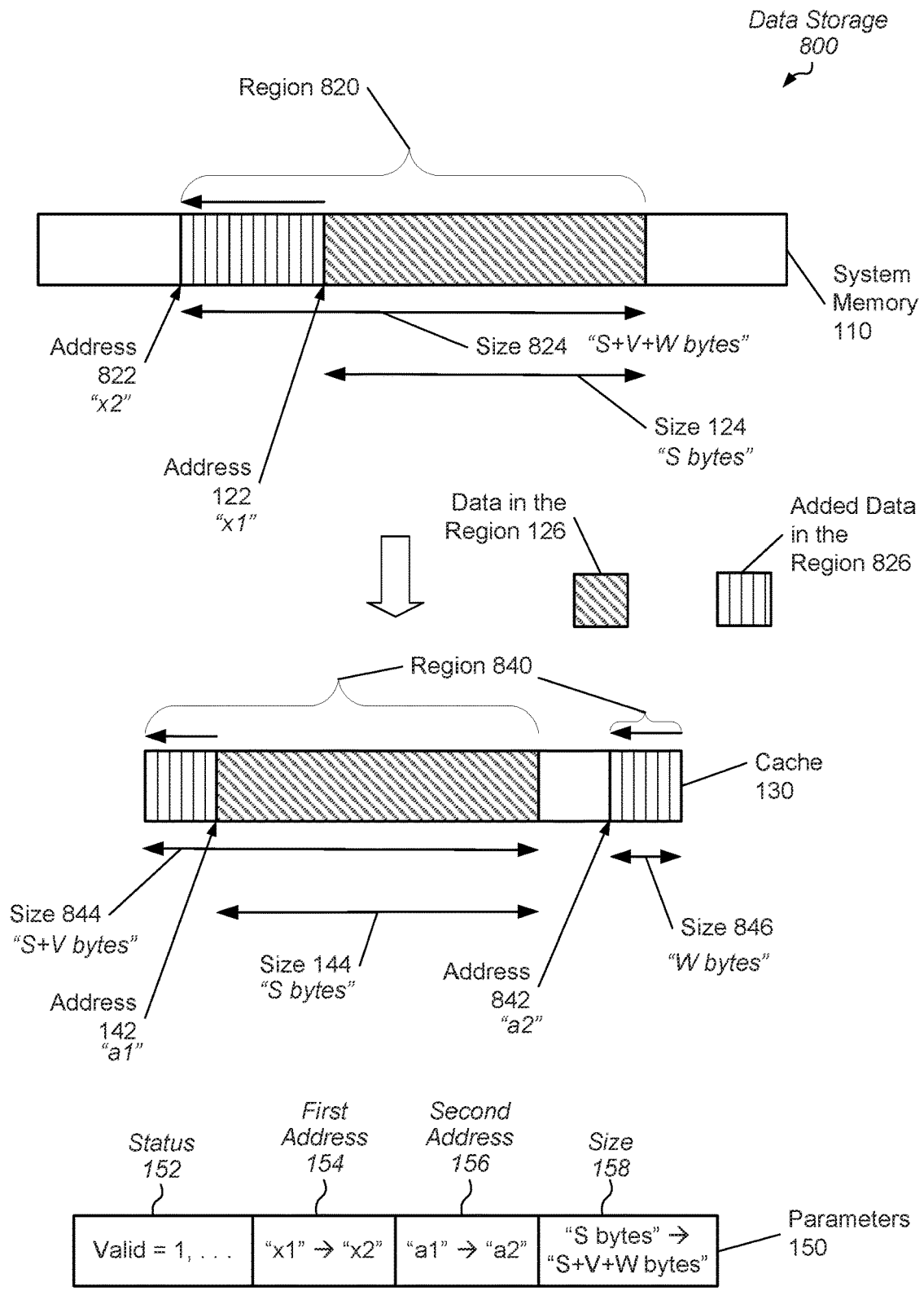
FIG. 8 is a block diagram of one embodiment of data storage.

Referring to FIG. 8, a generalized block diagram of one embodiment of data storage 800 is shown. Data 126 is contiguous data stored in the system memory 110. Data 826 is contiguous data added to the region in the system memory 110 to create the region 820. The size of contiguous data in the system memory 110 copied as a region grew from the size 124 to the size 824. The increase is in the left direction, rather than the right direction. Accordingly, the address pointing to the memory location storing data at the beginning of the region 820 is address 822 ("x2"), rather than the address 122 ("x1").

The last-level cache 130 stores in the region 840 a copy of the contiguous data 126 and data 826 of the region 820. Accordingly, the size of contiguous data in the last-level cache 130 maintained as a region grew from the size 144 to the sum of the size 844 and the size 846. The contiguous data wrapped around the last-level cache 130. The increase is in the left direction, rather than the right direction. Accordingly, the address pointing to the memory location storing data at the beginning of the region 840 is address 842 ("a2"), rather than the address 142 ("a1"). The region parameters 150 characterize the regions 820 and 840. The start addresses 122 and 142 change, and the fields 154 and 156 indicate the changes in the region parameters 150. Logic also updates the size field 158 to an increased amount. In the example, the logic updates the size field 158 from S bytes to S+V+W bytes where S, V and W are positive, non-zero integers. The access of a wrap around region alters the calculation of the translated address for the last-level cache 130. Logic uses a computation as described earlier for data storage 600.

Figure 9:
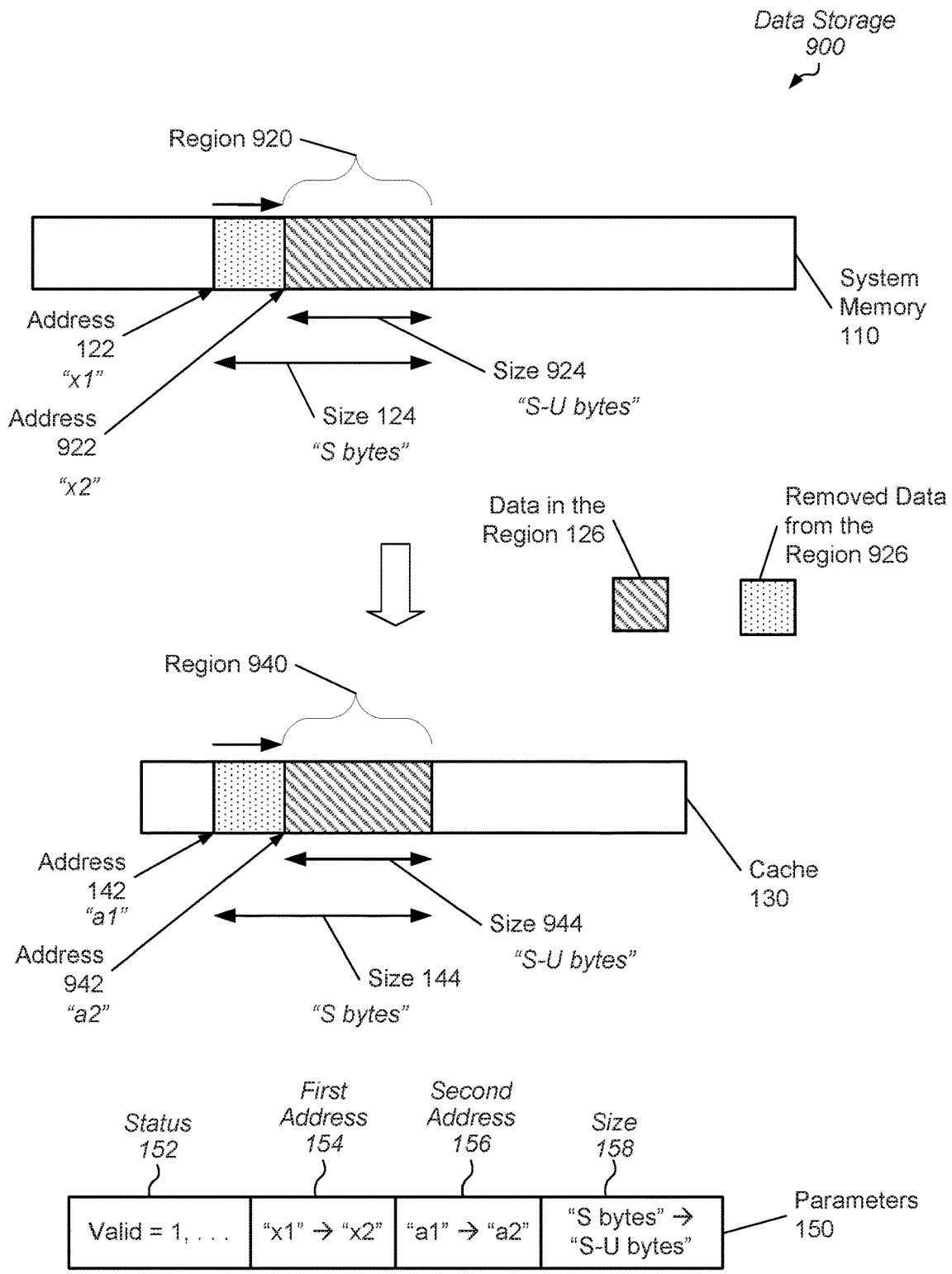
FIG. 9 is a block diagram of one embodiment of data storage.

Referring to FIG. 9, a generalized block diagram of one embodiment of data storage 900 is shown. Data 126 is contiguous data stored in the system memory 110. Data 926 is contiguous data removed from the region in the system memory 110 to create the region 920. The size of contiguous data in the system memory 110 copied as a region reduced from the size 124 to the size 924. The decrease is in the right direction, rather than the left direction. Accordingly, the address pointing to the memory location storing data at the beginning of the region 920 is address 922 ("x2"), rather than the address 122 ("x1").

The last-level cache 130 stores in the region 940 a copy of the contiguous data 126 of the region 920. Accordingly, the size of contiguous data in the last-level cache 130 maintained as a region reduced from the size 144 to the size 944. The decrease is in the right direction, rather than the left direction. Accordingly, the address pointing to the memory location storing data at the beginning of the region 940 is address 942 ("a2"), rather than the address 142 ("a1"). The region parameters 150 characterize the regions 920 and 940. The start addresses 122 and 142 change, and the fields 154 and 156 indicate the changes in the region parameters 150. Logic also updates the size field 158 to a decreased amount. In the example, the logic updates the size field 158 from S bytes to S-U bytes where S and U are positive, non-zero integers. It is noted that if the decrease in sizes of the regions occurred at the end of the regions and in the left direction, rather than the right direction, then the addresses 122 and 142 remain the same while the size field 158 is still updated.

Figure 10:
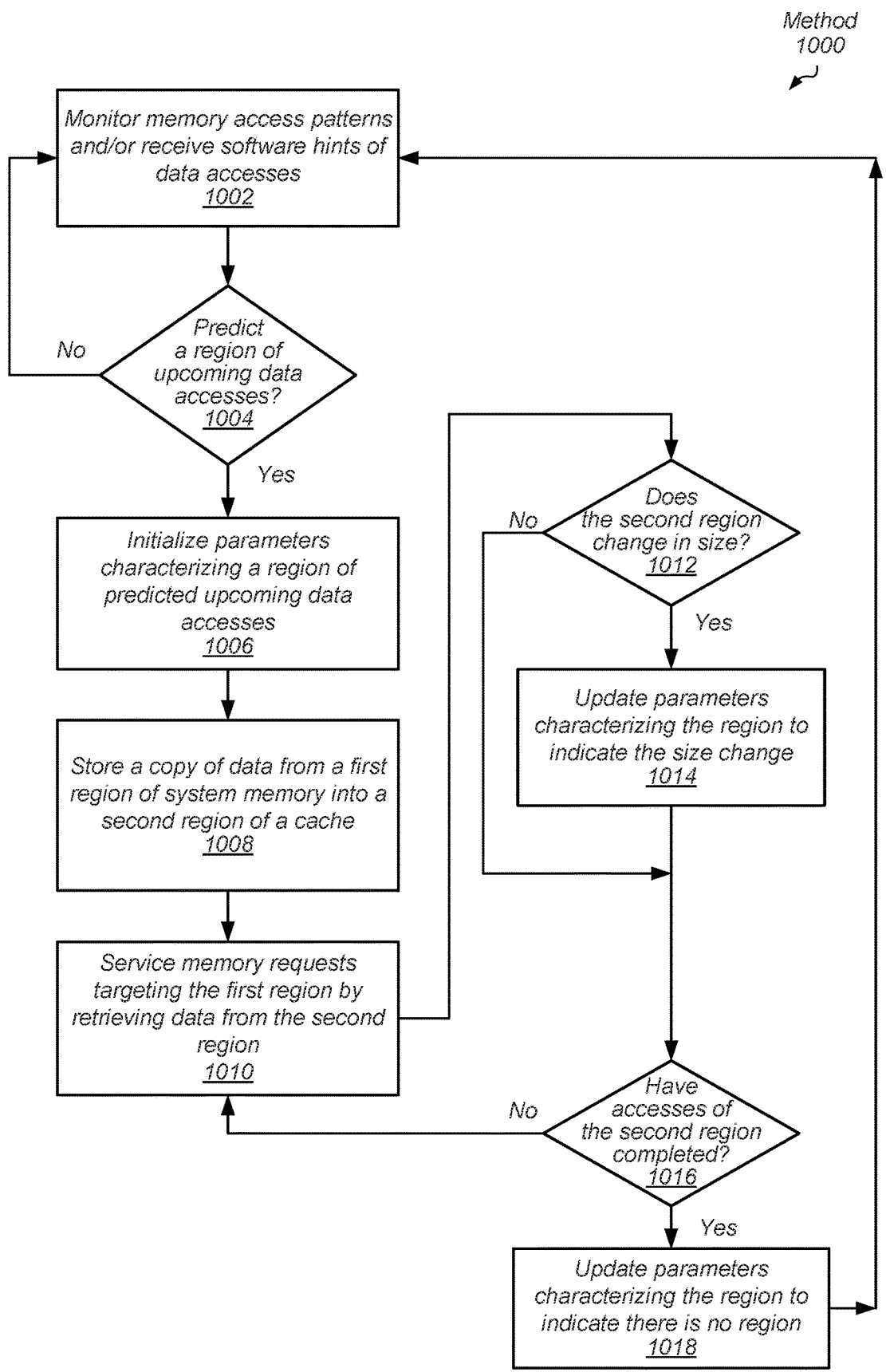
FIG. 10 is a flow diagram of one embodiment of a method for performing efficient memory accesses in a computing system.

Referring now to FIG. 10, one embodiment of a method 1000 for performing memory accesses in a computing system is shown. Logic monitors memory access patterns and/or receives software hints of data accesses (block 1002). As described earlier, software techniques with particular instructions used as hints, hardware techniques such as the techniques used by hardware prefetchers, or a combination are used to determine when to begin defining a region of memory.

If logic does not predict a region of upcoming data accesses ("no" branch of the conditional block 1004), then control flow of method 1000 returns to block 1002 where logic monitors memory access patterns and/or receives software hints. If logic predicts a region of upcoming data accesses, ("yes" branch of the conditional block 1004), then the logic initializes parameters characterizing the region of predicted upcoming data accesses (block 1006). For example, the logic stores a start address for the region of upcoming data accesses in the system memory, and stores a start address for this region in the last-level cache. Additionally, the logic stores a region size for this region. In some embodiments, an initial region size is provided in a programmable register of multiple control and status registers. In some designs, the initial size is between the fine granularity of a cache line size (e.g., 64 bytes) and a page size (e.g., 4 kilobytes or more).

Logic stores a copy of contiguous data from the region of upcoming data accesses in the system memory into the last-level cache. For example, the logic stores a copy of data from a first region of system memory into a second region of a last-level cache (block 1008) where each of the first region and the second region corresponds to the region of the predicted upcoming data accesses in the system memory. Logic services memory requests targeting the first region by accessing data from the second region (block 1010). If logic determines the second region changes size ("yes" branch of the conditional block 1012), then logic updates parameters characterizing the region to indicate the size change (block 1014).

If logic determines the second region does not change in size ("no" branch of the conditional block 1012), and accesses of the second region have not completed ("no" branch of the conditional block 1016), then control flow of method 1000 returns to block 1010. In block 1010, logic services memory requests targeting the first region by accessing data from the second region. If the accesses of the second region have completed ("yes" branch of the conditional block 1016), then logic updates parameters characterizing the region to indicate there is no region (block 1018). Afterward, control flow of method 1000 returns to block 1002 where logic monitors memory access patterns and/or receives software hints.

Figure 11:
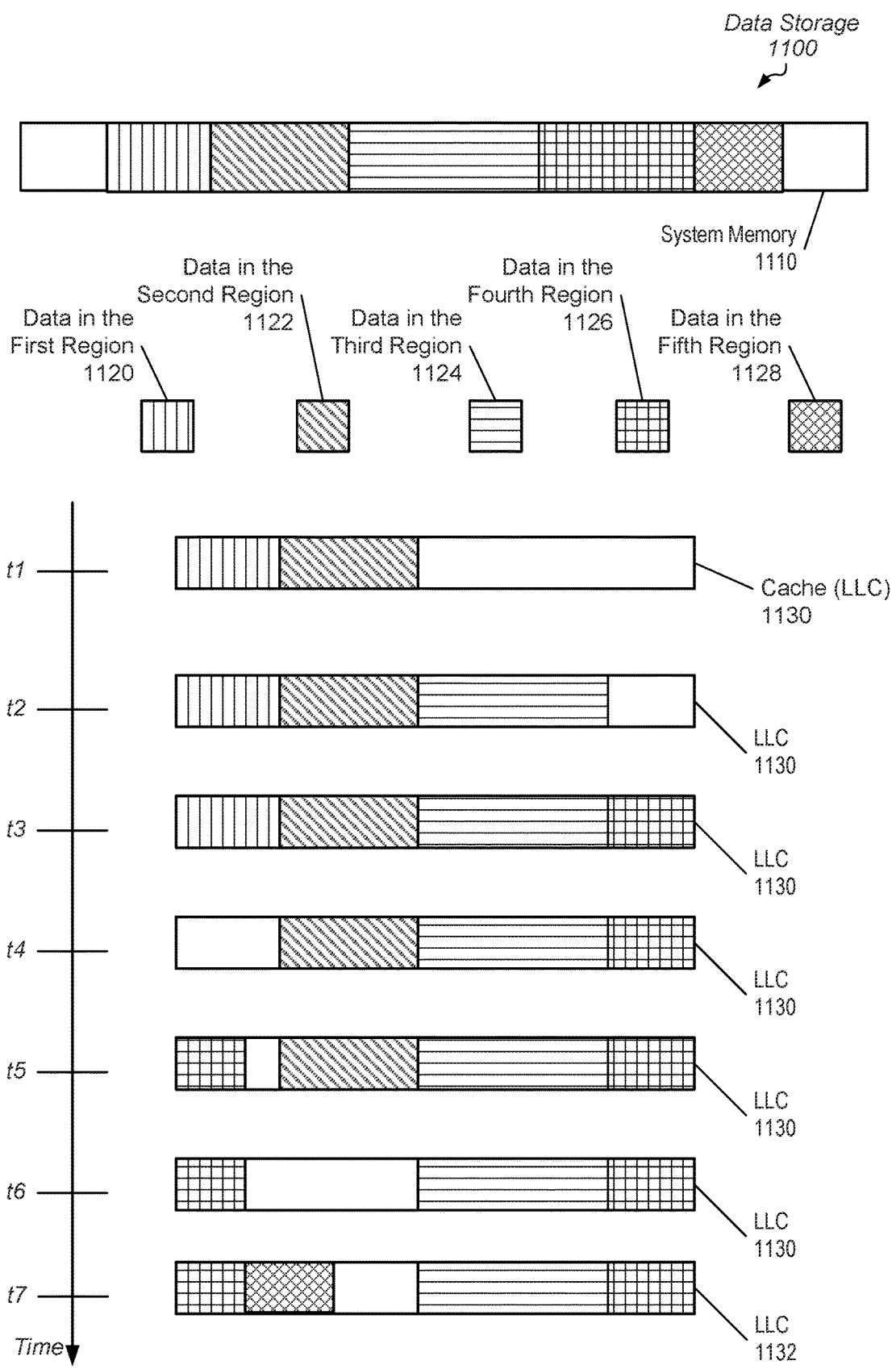
FIG. 11 is a block diagram of one embodiment of data storage.

Referring to FIG. 11, a generalized block diagram of one embodiment of data storage 1100 is shown. Each of system memory 1110 and a last-level cache 1130 store data. Processing units, communication interfaces and so forth are not shown for ease of illustration. Although the description describes the cache 1130 as a last-level cache, in other embodiments, the cache 1130 is another level within the cache memory subsystem. Data 1120-1128 are contiguous data stored in the system memory 1110. The last-level cache 1130 stores a copy of a portion of the contiguous data 1120-1128 at different points in time.

In one design example, the weights of a large (deep) neural network are stored in system memory 1110, such as off-package DRAM. The weights, such as data 1120-1128, are too large to fit in the last-level cache 1130, such as in-package 3D DRAM. During training of the neural network, the weights are evaluated by a processing unit executing a software application. From points in time t1 to 11/7 (or times t1 to t7), the size and content of the region stored in the last-level cache 1130 changes. The data 1120 corresponds to a first layer of weights of a multi-layer neural network. The data 1122 corresponds to a second layer of weights of the multi-layer neural network, and so on.

Initially, the data 1120 is copied into the last-level cache 1130 at time t0 (not shown). At the later time t1, the data 1122 is added to the region stored in the last-level cache 1130. Similarly, at times t2 and t3, the data 1124 and the data 1126 are added to the region stored in the last-level cache 1130. As the evaluation of the neural network proceeds by inference or forward propagation, the region in the last-level cache 1130 expands in order to store the weights. The accessing of the neural network's weights proceeds in a regular, predictable manner. Therefore, the region in the last-level cache 1130 is increased sufficiently ahead of the evaluation of the weights. As described earlier, programmable registers of CSRs 347 (of FIG. 3) store the parameters L and P to indicate when and by how much to change the size of the region stored in the last-level cache. Accordingly, the processing unit accesses the weights in the in-package last-level cache, rather than in the off-package DRAM.

At time t3, the entire last-level cache 1130 is filled. At this time, logic in the cache controller or in the processing unit adjusts the size of the region by decreasing the size from the left. At time t4, the logic removes the data 1120 from the region in the last-level cache 1130. The logic updates region parameters accordingly. Due to the nature of the software application performing the training of the weights, once the processing unit evaluates a given layer, the corresponding weights are not needed again for the current inference or forward propagation. Therefore, in some designs, the given layer of weights are removed from the region of the last-level cache 1130. At time t5, data 1126 is added to the region of the last-level cache 1130. The region wraps around the last-level cache 1130. The access of a wraparound region alters the calculation of the translated address for the last-level cache 130. Logic uses a computation as described earlier for data storage 600.

At time t6, the logic removes the data 1122 from the region in the last-level cache 1130. The logic updates region parameters accordingly. At time t7, the logic adds data 1128 to the region of the last-level cache 1130. After the processing unit has processed the last layer of the neural network, the processing unit generates a final output. The processing unit typically compares this final output against an expected value to compute an error or loss. The training of the neural network then continues with a backward propagation phase. During the backward propagation, the processing unit processes the layers of the multi-layered neural network in reverse order. Logic allocates and deallocates the region of the last-level cache 1130 in a manner to support the reverse order.

Figure 12:
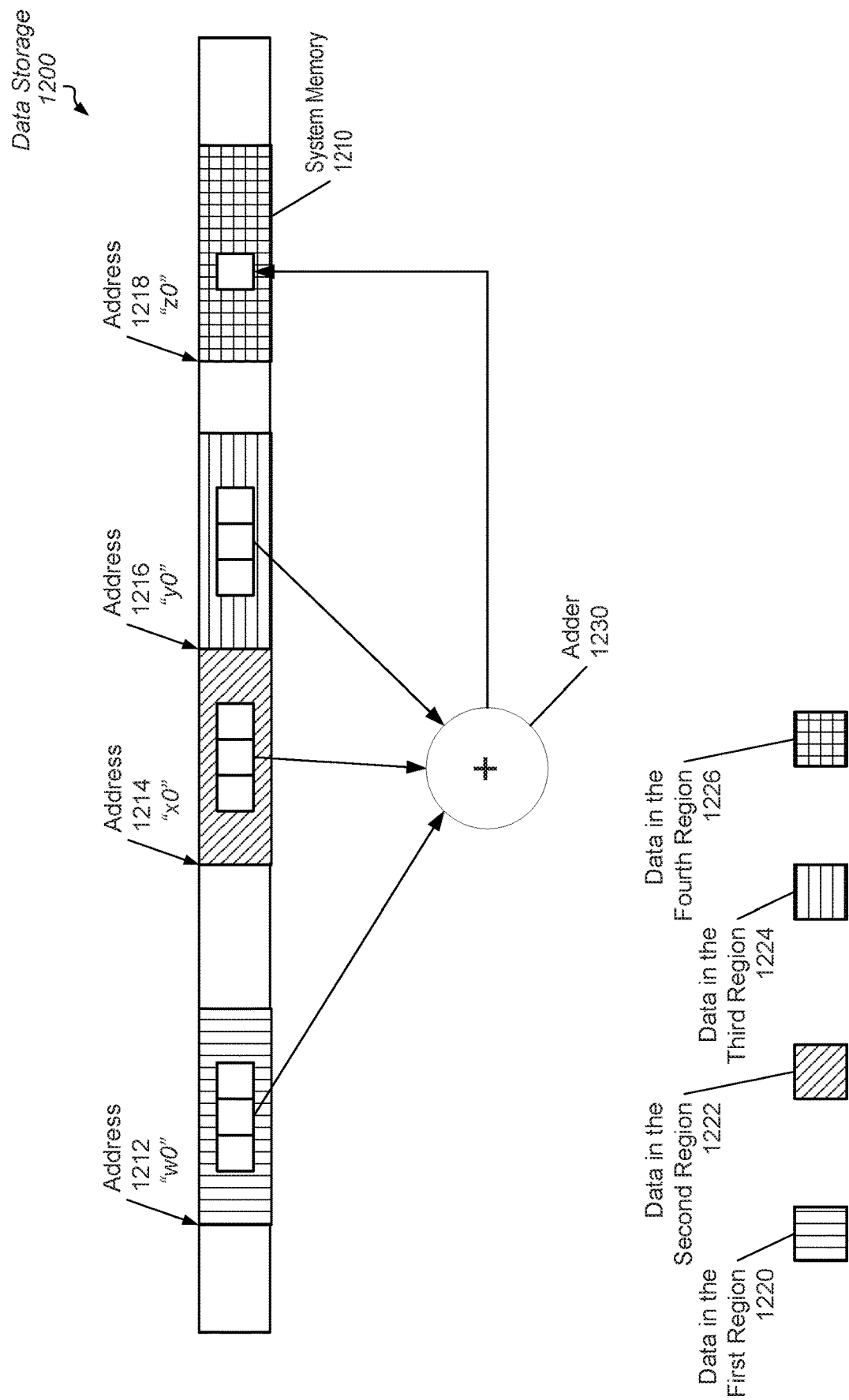
FIG. 12 is a block diagram of one embodiment of data storage.

Referring to FIG. 12, a generalized block diagram of one embodiment of data storage 1200 is shown. The system memory 1210 stores data. Processing units, communication interfaces and so forth are not shown for ease of illustration. The system memory 1210 stores data of multiple regions. Examples of the regions include a first region 1220 pointed to by the address 1212 ("w0"), data of a second region 1222 pointed to by the address 1214 ("x0"), data of a third region 1224 pointed to by the address 1216 ("y0"), and data of a fourth region 1226 pointed to by the address 1218 ("z0").

In this example, a software application performs a stencil-like calculation where each element in an output vector stored in the region pointed to by the address 1218 ("z0") is a sum of elements in the other vectors pointed to by addresses 1212-1216 ("w0"-"y0"). For example, if the output vector is represented as vector "d", and each of the vectors in the other regions are represented as "a" to "c", then the value of the element d[i] of the vector d is a[i−1]+a[i]+a[i+1]+b[i−1]+b[i]+b[i+1]+c[i−1]+c[i]+c[i+1]. The adder 1230 sums the values of the elements of the input vectors to generate an element in the output vector. In many cases, none of the input vectors fit within an in-package cache. However, each region within the in-package cache is capable of storing an active portion of each respective vector. As the calculation proceeds, each of the regions are updated to maintain an active portion of each vector. An example of such a scheme is shown in the following description.

Figure 13:
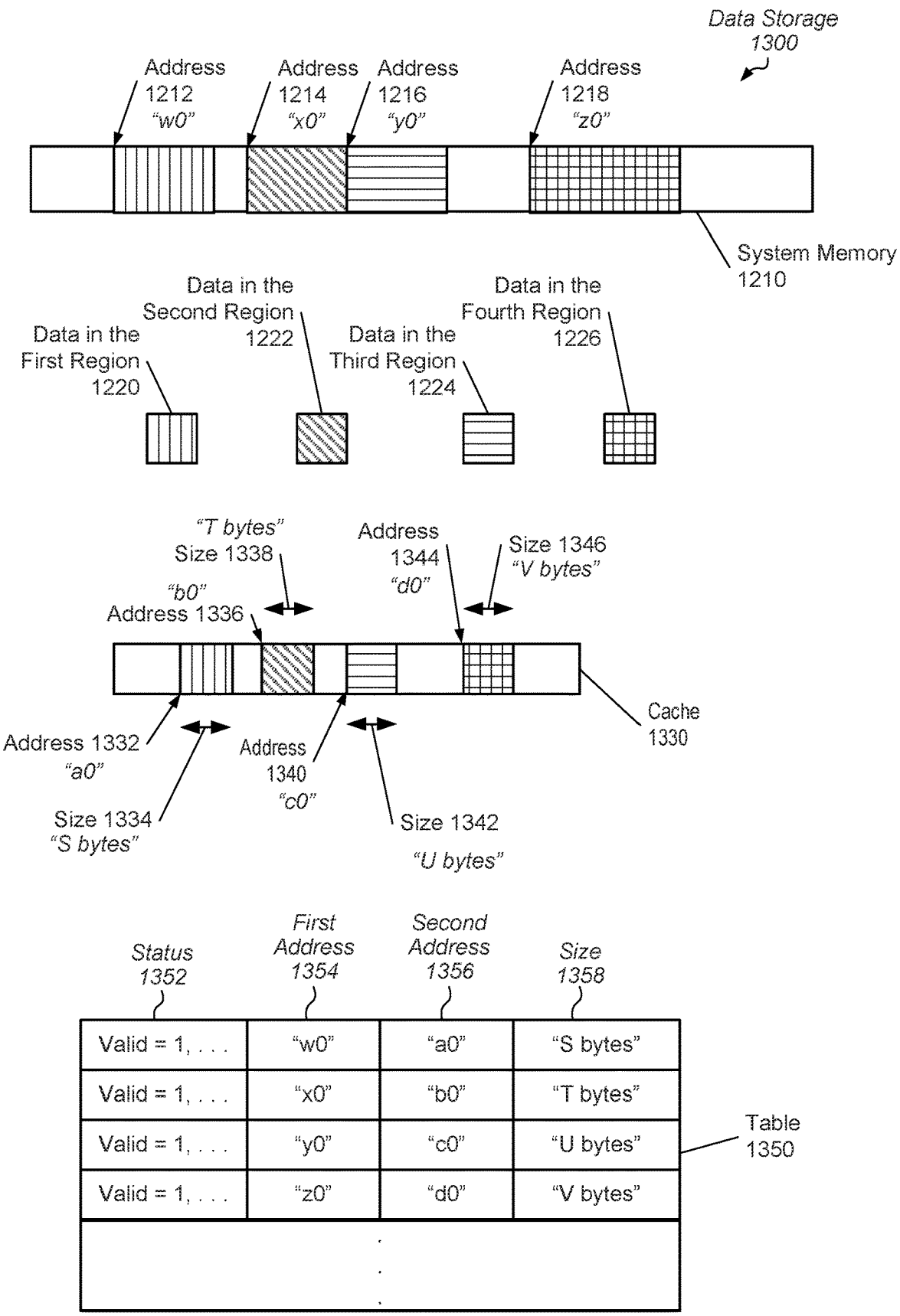
FIG. 13 is a block diagram of one embodiment of data storage.

Referring to FIG. 13, a generalized block diagram of one embodiment of data storage 1300 is shown. Circuitry and logic previously described are numbered identically. The last-level cache (LLC) 1330 stores a copy of data stored in the system memory 1210. Although the description describes the cache 1330 as a last-level cache, in other embodiments, the cache 1330 is another level within the cache memory subsystem. Processing units, communication interfaces and so forth are not shown for ease of illustration. The last-level cache 1330 stores data of multiple regions. Examples of the regions include a first region pointed to by the address 1332 ("a0") with a size 1334 ("S bytes"), a second region pointed to by the address 1336 ("b0") with a size 1338 ("T bytes"), a third region 1224 pointed to by the address 1340 ("c0") with a size 1342 ("U bytes"), and a fourth region pointed to by the address 1344 ("d0") with a size 1346 ("V bytes").

The table 1350 stores region parameters for the regions stored in the last-level cache 1330. In many designs, the fields 1352-1358 are equivalent to the fields 152-158 of the region parameters 150 (of FIG. 1). Here, the table 1350 supports multiple separate regions, rather than a single region. In the illustrated embodiment, the table 1350 includes four valid rows (entries) for supporting the four regions in the last-level cache 1330. Although four regions and entries are shown, any number of entries and regions are used in other examples. To support the multiple regions, logic maintains the information in the table 1350 to ensure that the multiple regions grow, reduce and wrap around the last-level cache 1330 without overrunning another region. For each memory access of the last-level cache 1330, logic compares the requested address against each valid, supported region in the last-level cache 1330. In various designs, the table 1350 stores information in a fully-associative manner. The requested address now checks against all N sets of region definition registers (analogous to a fully-associative cache structure).

Figure 14:
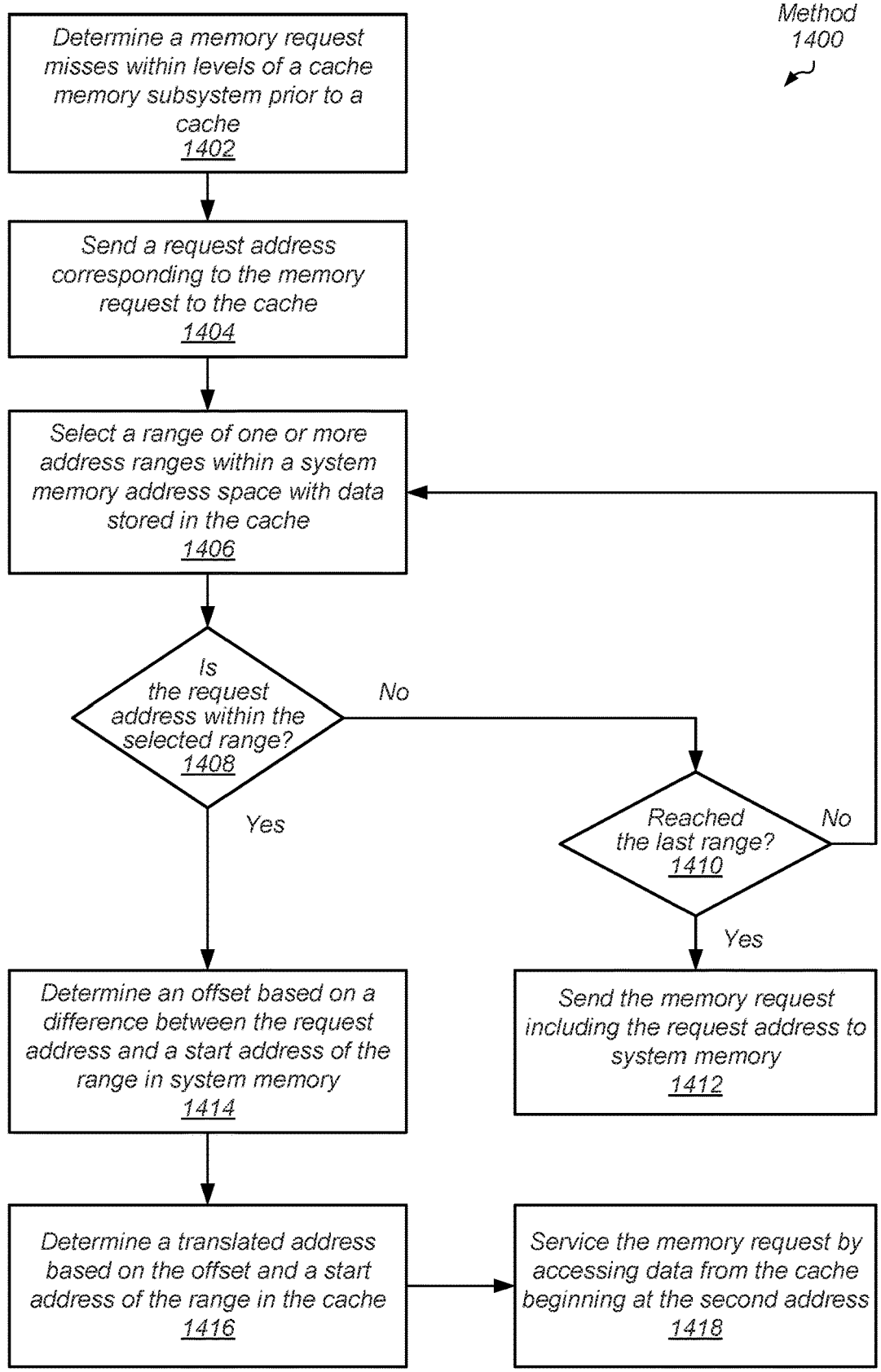
FIG. 14 is a flow diagram of one embodiment of a method for performing efficient memory accesses in a computing system.

Referring now to FIG. 14, one embodiment of a method 1400 for performing memory accesses in a computing system is shown. One or more processing units execute one or more computer programs, or software applications. Examples of a processing unit are a processor core within a CPU, a GPU, or other. In some embodiments, a System-in-Package (SiP) includes the processing unit and high bandwidth memory. One example of the high bandwidth memory is a 3D integrated memory, such as a 3D DRAM. In an embodiment, the processing unit utilizes at least a portion of the 3D DRAM as a cache. The processing unit determines a memory request misses within a cache memory subsystem in levels lower than the last-level cache (block 1402). In various embodiments, the processing unit utilizes at least a portion of the high bandwidth memory as a last-level cache. The processing unit sends an address corresponding to the memory request to the last-level cache (block 1404).

Logic selects a range of one or more address ranges within a system memory address space with data stored in the last-level cache (block 1406). If logic determines the request address is not within the selected range ("no" branch of the conditional block 1408), and the last range is not reached ("no" branch of the conditional block 1410), then control flow of method 1400 returns to block 1406. In block 1406, logic selects another range of the one or more address ranges. If logic determines the request address is not within the selected range ("no" branch of the conditional block 1408), and the last range is reached ("yes" branch of the conditional block 1410), then logic sends the memory request including the request address to system memory (block 1412).

If logic determines the request address is within the selected range ("yes" branch of the conditional block 1408), then logic determines an offset based on a difference between the address and a start address of the range in system memory (block 1414). Logic determines a translated address based on the offset and a start address of the range in the last-level cache (block 1416). Logic services the memory request by accessing data from the last-level cache beginning at the translated address (block 1418).

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become appar-

What is claimed is:

1. An apparatus comprising:
an interface configured to receive a plurality of memory access requests comprising request addresses; and
circuitry configured to:
maintain an identification of a first region of contiguous data in a system memory that has a copy of the contiguous data stored in a second region of a cache, wherein:
the cache and the system memory are at different hierarchical levels of a memory subsystem; and
the first region represents a range of addresses and the identification comprises:
a first start address that identifies a beginning of the first region; and
a size of the second region; and
select a first memory access request of the received plurality of memory access requests;
compare a first request address of the first memory access request to each of the first start address and a sum of the first start address and the size of the second region to determine whether the cache stores requested data of the first memory access request;
send the first memory access request to the system memory, in response to determining the first request address is not within the range of addresses; and
service the first memory access request by accessing data from the cache, in response to determining the first request address is within the range of addresses.

2. The apparatus as recited in claim 1, wherein to service the selected first memory access request by accessing data from the cache, the logic is further configured to:
determine an offset based on a difference between the first request address and the first start address;
determine a translated address based on the offset and a second start address pointing to a beginning of the second region of the cache; and
service the memory request by accessing data from the cache beginning at the translated address.

3. The apparatus as recited in claim 2, wherein in response to determining the translated address points to a memory location outside of the second region of the cache, the logic is further configured to:
determine a wrap around address by subtracting a largest address of the second region from the translated address; and
service the memory request by accessing data from the cache beginning at the wrap around address.

4. The apparatus as recited in claim 2, wherein the logic is further configured to:
maintain the second start address; and
determine the translated address as a sum of the offset and the second start address.

5. The apparatus as recited in claim 4, wherein in response to determining a size of the second region changes, the logic is further configured to:
update one or more of the first start address, the second start address and the size of the second region; and
update the range of addresses based at least in part on the updated size of the second region.

6. The apparatus as recited in claim 4, wherein in response to predicting a region of upcoming data accesses, the logic is further configured to:
initialize one or more of the first start address, the second start address and the size of the second region; and
store a copy of contiguous data from the region of upcoming data accesses in the system memory into the cache.

7. The apparatus as recited in claim 6, wherein predicting the region of upcoming data accesses comprises one or more of:
the logic monitors received memory access requests and identifies a pattern used to identify the region of upcoming data accesses; and
the logic receives a hint from software that identifies the region of upcoming data accesses.

8. The apparatus as recited in claim 6, wherein in response to determining there are no more upcoming data accesses for the region of upcoming data accesses, the logic is further configured to:
store an indication that specifies that there is no region stored in the cache by updating the size of the second region to a value of zero bytes.

9. The apparatus as recited in claim 1, wherein the logic is further configured to maintain an identification of a plurality of regions of contiguous data in the system memory, each region has a copy of respective contiguous data stored in the cache, wherein the logic is further configured to:
determine a plurality of ranges of addresses, one for each of the plurality of regions;
select a second memory access request of the received plurality of memory access requests;
compare a second request address of the second memory access request to one or more of the start addresses and sums of the start addresses and corresponding sizes of the copies stored in the cache to determine whether the cache stores requested data of the second memory access request;
send the second memory access request to system memory, in response to determining the second request address is not within any of the plurality of ranges of addresses; and
service the second memory access request by accessing data from the cache, in response to determining the second address is within one of the plurality of ranges of addresses.

10. A method, comprising:
receiving a plurality of memory access requests comprising request addresses;
maintaining an identification of a first region of contiguous data in a system memory that has a copy of the contiguous data stored in a second region of a cache, wherein:
the cache and the system memory are at different hierarchical levels of a memory subsystem; and
the first region represents a range of addresses and the identification comprises:
a first start address pointing to a memory location storing data at a beginning of the first region; and
a size of the second region; and
selecting a first memory access request of the received plurality of memory access requests;
comparing a first request address of the first memory access request to each of the first start address and a sum of the first start address and the size of the second region to determine whether the cache stores requested data of the first memory access request;

sending the first memory access request to the system memory, in response to determining the first request address is not within the range of addresses; and servicing the first memory access request by accessing data from the cache, in response to determining the first request address is within the range of addresses.

11. The method as recited in claim 10, wherein to service the first memory access request accessing data from the cache, the method further comprises:

determining an offset based on a difference between the first request address and the first start address;

determining a translated address based on the offset and a second start address pointing to a beginning of the second region of the cache; and servicing the memory request by accessing data from the cache beginning at the translated address.

12. The method as recited in claim 11, wherein in response to determining the translated address points to a memory location outside of the second region of the cache, the method further comprises:

determining a wrap around address by subtracting a largest address of the second region from the translated address; and servicing the memory request by accessing data from the cache beginning at the wrap around address.

13. The method as recited in claim 11, further comprising:
maintaining the second start address; and
determining the translated address as a sum of the offset and the second start address.

14. The method as recited in claim 13, wherein in response to determining a size of the second region changes, the method further comprises:

updating one or more of the first start address, the second start address and the size of the second region; and updating the range of addresses based at least in part on the updated size of the second region.

15. The method as recited in claim 13, wherein in response to predicting a region of upcoming data accesses, the method further comprises:

initializing one or more of the first start address, the second start address and the size of the second region; and storing a copy of contiguous data from the region of upcoming data accesses in the system memory into the cache.

16. A non-transitory computer readable storage medium storing program instructions, wherein the program instructions are executable by a processor to:

receive a plurality of memory access requests comprising request addresses;

maintain an identification of a first region of contiguous data in a system memory that has a copy of the contiguous data stored in a second region of a cache, wherein:

the cache and the system memory are at different hierarchical levels of a memory subsystem; and the first region represents a range of addresses and the identification comprises:

a first start address pointing to a memory location storing data at a beginning of the first region; and a size of the second region; and select a first memory access request of the received plurality of memory access requests;

compare a first request address of the first memory access request to each of the first start address and a sum of the first start address and the size of the second region to determine whether the cache stores requested data of the first memory access request;

send the first memory access request to the system memory, in response to determining the first request address is not within the range of addresses; and service the first memory access request by accessing data from the cache, in response to determining the first request address is within the range of addresses.

17. The non-transitory computer readable storage medium as recited in claim 16, wherein to service the first memory access request by accessing data from the cache, the program instructions are further executable by a processor to:

determine an offset based on a difference between the first request address and the first start address;

determine a translated address based on the offset and a second start address pointing to a beginning of the second region of the cache; and service the memory request by accessing data from the cache beginning at the translated address.

18. The non-transitory computer readable storage medium as recited in claim 17, wherein in response to determining the translated address points to a memory location outside of the second region of the cache, the program instructions are further executable by a processor to:

determine a wrap around address by subtracting a largest address of the second region from the translated address; and service the memory request by accessing data from the cache beginning at the wrap around address.

19. The non-transitory computer readable storage medium as recited in claim 17, wherein the program instructions are further executable by a processor to:

maintain the second start address; and determine the translated address as a sum of the offset and the second start address.

20. The non-transitory computer readable storage medium as recited in claim 19, wherein in response to determining a size of the second region changes, the program instructions are further executable by a processor to:

update one or more of the first start address, the second start address and the size of the second region; and update the range of addresses based at least in part on the updated size of the second region.

* * * * *